N. SPIN.
WHEEL.
APPLICATION FILED SEPT. 16, 1918.
1,313,348.
Patented Aug. 19, 1919.
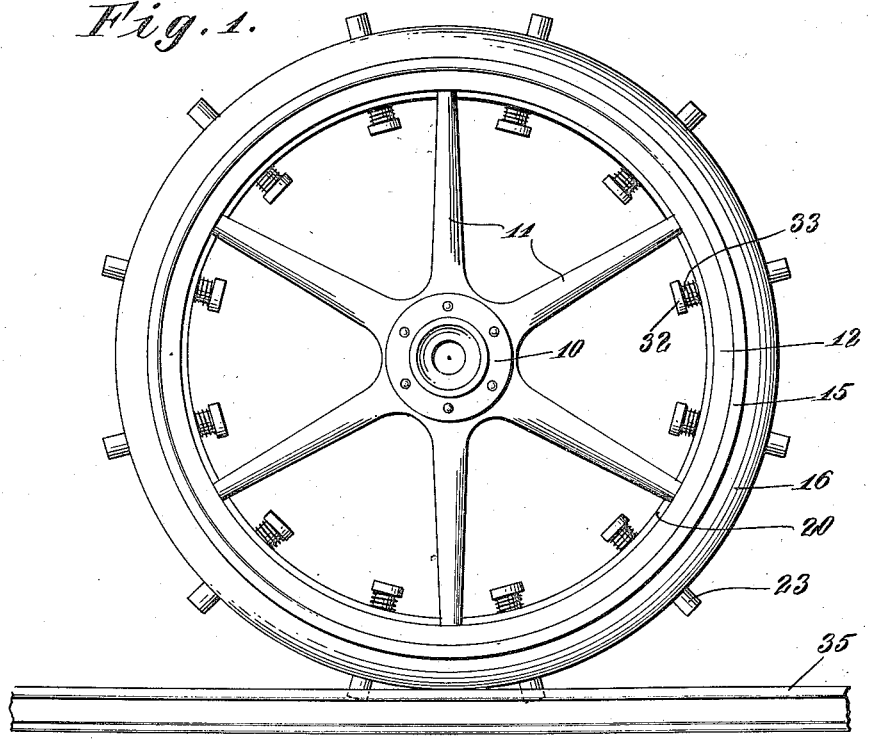
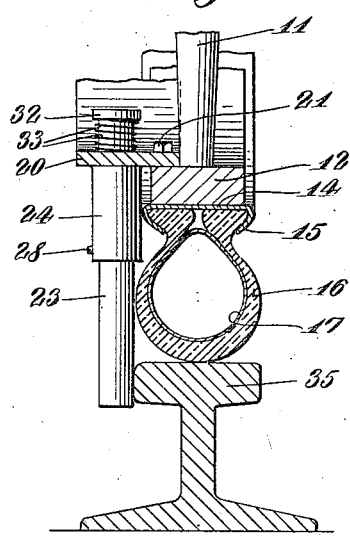
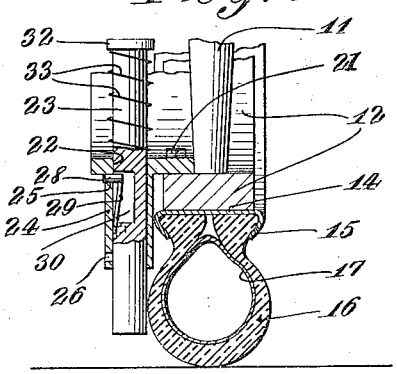
INVENTOR
Nicholas Spin.
BY Oscar Grier
his ATTORNEY

UNITED STATES PATENT OFFICE.

NICHOLAS SPIN, OF AUBURN, NEW YORK.

WHEEL.

1,313,348.  Specification of Letters Patent.  Patented Aug. 19, 1919.

Application filed September 16, 1918. Serial No. 254,269.

*To all whom it may concern:*

Be it known that I, NICHOLAS SPIN, a citizen of Poland, residing at Auburn, county of Cayuga, and State of New York, have invented certain new and useful Improvements in Wheels, of which the following is a specification.

This invention relates to improvements in vehicle wheels and has as its special object, the provision of means which may be readily engaged with a standard type of the better grade of wheels whereby the vehicle may be guided along the trackway of a railroad or used in the ordinary manner upon a level plane surface.

A further object is to provide such devices in the form of attachments which may be applied to wheels of various types of construction without in any way interfering with their usual function.

These and other like objects are attained by the novel construction and combination of parts hereinafter described and shown in the accompanying drawing, forming a material part of this disclosure, and in which—

Figure 1 is a side elevational view of a wheel made in accordance with the invention.

Fig. 2 is an enlarged fragmentary transverse sectional view, indicating the application of the invention, and Fig. 3 is a similar view showing the rail engaging elements retracted, permitting the wheel to be used in the ordinary manner.

Referring to the drawings, the wheel, which may be conventional type of construction, consists of a rigid hub 10, from which, radiate spokes 11, joined at their outer ends by a rim 12, and secured upon its periphery is a metallic band 14, having inturned lateral edges 15, adapted to secure the tire 16, which is here shown to be of the pneumatic variety, containing an inflatable tube 17, the entire construction being of well known type such as are to be found commonly upon automobiles and the better class of vehicles in general.

The improvements consist in securing to the inner peripheral surface of the rim or felly 12, an annular ring or band 20, the same being rigidly engaged by the screws 21, or like fastenings, at spaced intervals around its periphery. This band is drilled transversely forming openings 22, in which are slidably engaged plungers 23, the same passing downwardly through guide sleeves 24, formed with, or secured to, the outer periphery of the band 20, and which contain transverse openings 25 and 26, receivable of pins 28, carried on the outer end of flat spring 29, secured to the plungers 23 in recesses 30, formed laterally in the surface thereof.

The upper ends of these plungers are formed with enlarged heads 32, and abutting against their undersides are helically coiled compression springs 33, their lower ends resting against the inner surface of the bands 20, the construction being such that the plungers 23 are normally held in a retracted position, as shown in Fig. 3.

When it is desired to use the vehicle on the rails of a track-way the pins 28 are pressed into the recess 30, from the openings 25, the plungers pressed downwardly and the pins allowed to be pressed outwardly by the spring 29, so that they enter the openings 26, as shown in Fig. 2, at which time the plungers will be held in an extended position engageable with the side of the rails 35.

In operation, the parts having been assembled with the wheel as indicated and if it is desired to use the wheel upon a level surface in an ordinary manner, the pins 28, are retracted permitting the plungers to be raised and then entered into the upper openings 25, which obviously holds the plungers in a raised position, as shown in Fig. 3.

When used upon a railway, the pins are pressed into the recess the plungers pushed outwardly, as shown in Figs. 1 and 2, in which condition they serve to guide the treads 16 so as to rest upon the upper surface of the rail head, while the plungers make contact with the outer edges thereof and guide the wheels in an obvious manner.

Having thus described my invention what I claim as new and desire to secure by Letters Patent, is—

In a device of the class described, the combination with a vehicle wheel having a rim and tread, of a rigid, metallic band secured to the periphery of said rim, a plurality of spaced sleeves fixed upon the outer periphery of said band, closely adjacent to said rim and tread, plungers slidably engaged in said sleeves and band, said plungers containing lateral recesses midway of their length, within said sleeves, springs fixed within said plungers operable within their recesses, pins secured at the outer ends of said springs, movable in said recesses, said pins being engageable in the lateral openings in the walls of said sleeves, heads formed at the inner ends of said plungers, and springs encircling said plungers adapted to exert pressure against said head, normally retracting plunger.

In testimony whereof I have affixed my signature.

NICHOLAS SPIN.